FOOTWEAR

Original Filed Aug. 12, 1968 2 Sheets-Sheet 1

Inventor:
Maxwell Sachs,
By Abbott Spear,
Attorney

Inventor:
Maxwell Sachs,
By Abbott Spear
Attorney

BEST AVAILABLE COPY

United States Patent Office

Re. 27,373
Reissued May 16, 1972

27,373
FOOTWEAR
Maxwell Sachs, 887 W. Roxbury Parkway, Brookline, Mass. 02162
Original No. 3,436,846, dated Apr. 8, 1969, Ser. No. 758,179, Aug. 12, 1968, which is a continuation-in-part of Ser. No. 600,872, Dec. 12, 1966. Application for reissue Apr. 2, 1970, Ser. No. 25,595
Int. Cl. A43b *00/00*
U.S. Cl. 36—2.5 W 36 Claims

Matter enclosed in heavy brackets [ ] appears in the original patent but forms no part of this reissue specification; matter printed in italics indicates the additions made by reissue.

ABSTRACT OF THE DISCLOSURE

Footwear is disclosed that has a socket in the heel area and a heel section detachably attached to the socket and including an upper part.

My invention pertains to footwear and to parts thereof, including sole and upper sections, and means for imparting variability so as to afford improvements in fit and appearance as well as to provide convenience and adaptability in use. The present application is a continuation-in-part of my co-pending application Ser. No. 600,872, filed Dec. 12, 1966, now abandoned.

Application Ser. No. 600,872 was based on the following earlier applications: Ser. No. 562,051, filed June 13, 1966, and Ser. No. 562,056, filed June 13, 1966. Ser. No. 562,051 was based on the following earlier applications: Ser. No. 417,868, filed Dec. 11, 1964; Ser. No. 414,159, filed Nov. 27, 1964; Ser. No. 284,288, filed May 24, 1963; Ser. No. 37,907, filed June 22, 1960; Ser. No. 755,156, filed Aug. 15, 1958; and Ser. No. 679,887, filed Aug. 23, 1957. Ser. No. 562,056, filed June 13, 1966, was based on the following earlier applications: Ser. No. 399,269, filed Sept. 25, 1964; Ser. No. 306,416, filed Aug. 30, 1963; and Ser. No. 129,891, filed Aug. 7, 1961.

In accordance with the invention, the general objectives are obtained by providing an article of footwear in which upper sections are detachably attached to sole sections and means are employed to maintain said upper sections in desired attached positions and to release them from said positions as desired. Slidable attachments, resilient sections and movable sections as well as other features are employed.

*The features of my invention apply to footwear of every kind. Details, such as the construction of the sole, can vary. For instance, a sole may have a single layer in some footwear while in other footwear a sole may consist of an outersole, innersole, shank tuck, and heel tuck all cemented together.*

Figure 1:
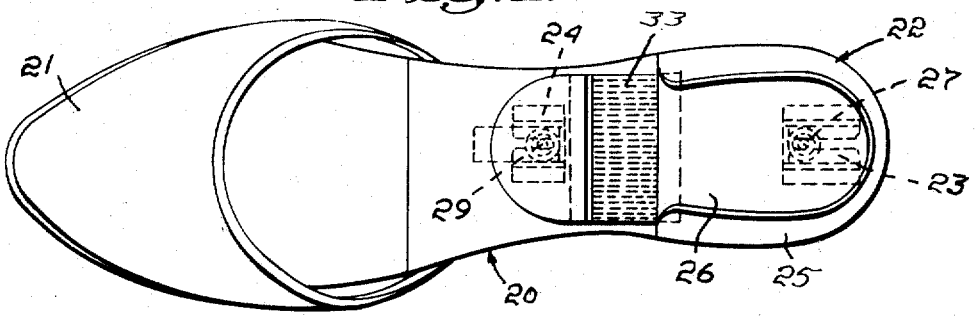
FIG. 1 is a top plan view of a shoe in accordance with the invention.

The shoe illustrated by FIG. 1 consists of a generally indicated sole 20 to which a vamp 21 is attached and a generally indicated heel section 22 is detachably attached. The socket 23 depressed in the sole 20 opens rearwardly and the socket 24 opens forwardly, thus opening in opposite directions. The heel upper section 25 is attached to section 26, which rests on the sole 20. Stud 27 in the heel area of the section 26 and stud 29 in the shank area of the section 26 connect section 26 to sockets 21 and 23 respectively. The openings in opposite directions together with the elastic area 33 provide means for attaching and detaching conveniently and maintaining the attachment while providing slidability and holding the heel section in the socket.

Figure 2:
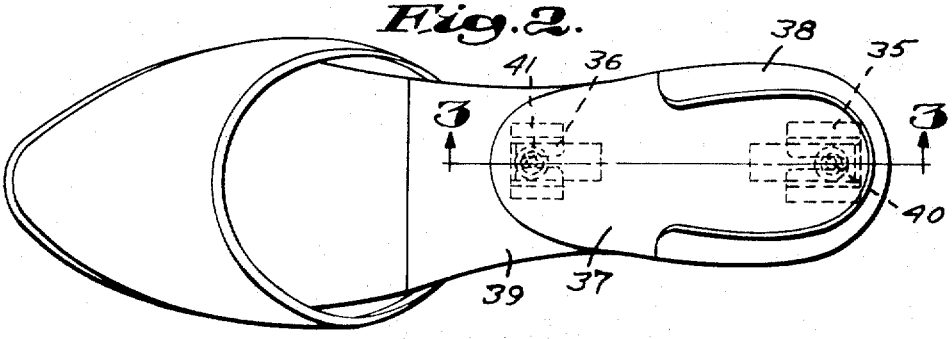
FIG. 2 is a top plan view of a shoe in accordance with another embodiment of the invention.
Figure 3:
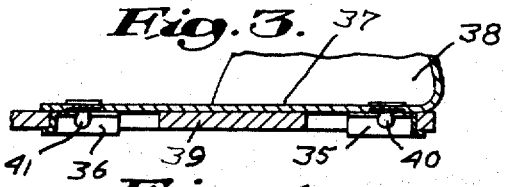
FIG. 3 is a section taken approximately along the line 3—3 of FIG. 2.

FIG. 2 shows a shoe similar to the shoe of FIG. 1, but with the sockets 35 and 36 facing toward each other. The material 37 attached to the upper 38 and resting on the sole 39 is detachably attached by studs 40 and 41 to the sockets 35 and 36 respectively in the sole 39 and is bendable in an upward direction to allow it to be slipped out of the sockets. The material 37 should preferably combine firmness with flexibility and preferably a significant amount of resilience, with a tendency to straighten out to the level of the sole. The section between the sockets can be contractable, as in the section 109 of FIG. 16 in a similar situation to be described later.

Figure 4:
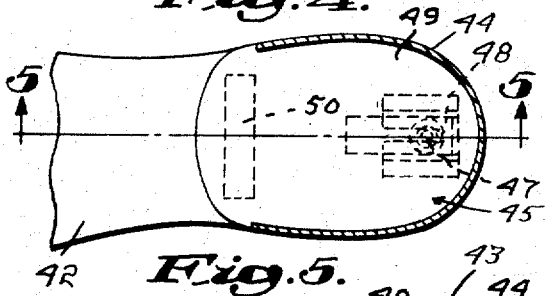
FIG. 4 is a fragmentary top plan view of the rear portion of a shoe in accordance with my invention.
Figure 5:
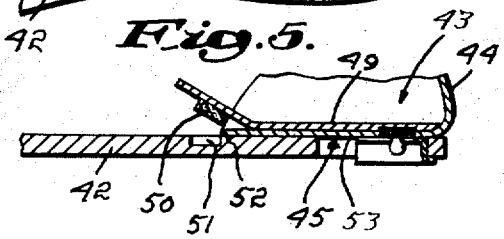
FIG. 5 is a section taken approximately along the line 5—5 of FIG. 4.

FIG. 4 is a top plan view and FIG. 5 is a section, approximately along the line 5—5 of FIG. 4, of the rear part of a shoe, showing a rear section of sole layer 42 and a heel upper section generally indicated at 43 with upper section 44 and material 45 connected to upper material 44 and resting on sole layer 42 and attached thereto by stud 47 in socket 48. The upper layer 49 of material 45 is shown in FIG. 5 to be bent up to display a downward protrusion or bar 50 designed for positioning an aperture or channel 51 in sole layer 42 adjacent to the front edge 52 of lower layer 53 of material 45, in which position, in conjunction with the firm bent-up section 54 of layer 49, it will serve to oppose the sliding of stud 47 and of socket 48. The bar 50 is shown as being made of resilient material such as polyurethane foam for snug fit, but non-resilient material may be used.

Figure 6:
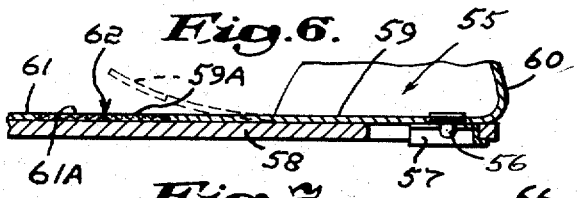
FIG. 6 is a similar section.

In FIG. 6 a heel section 55 is detachably attached by stud 56 to socket 57 depressed in sole layer 58, with a layer of material 59 attachable to upper portion 60 of the heel section 55 and resting on sole layer 58 in the heel area extending forwardly to butt up against the rear edge of top sole layer 61 at juncture point 62. Both the front edge of the layer 59 and the sole layer 61 are shown to be of resiliently compressible material, 59A and 61A, respectively. As shown, either or both edges can be made resiliently contractible, but they need not be. The dotted line position of the layer 59 in FIG. 6 indicates how that layer can be bent up, even though it has a substantial degree of firmness, to permit the heel section to slide forward and the attaching stud 56 to slide out of the socket 57.

Figure 7:
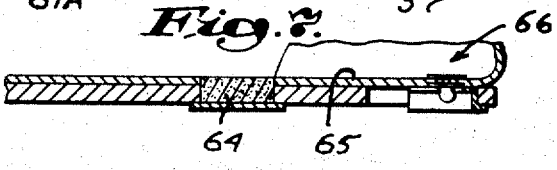
FIG. 7 is a similar section.

FIG. 7 shows a sliding bar 64 which may slide out of ıe way of the bottom material 65 of heel section 66. lere also the bar 64 may be resilient as shown or may e non-resilient.

Figure 8:
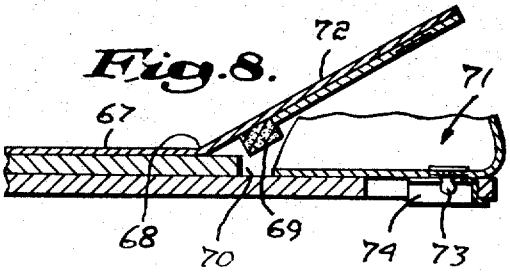
FIG. 8 is a similar section.

FIG. 8 shows a sole layer 67 pivoting or binding up-'ard at 68 and having a bar 69 attached to its underside ɔr positioning in channel 70 to oppose the forward slid-ıg of heel section 71. The upward-pitched portion 72 of ıyer 67 is firm enough to oppose the forward sliding of eel section 71 and the sliding of stud 73 out of socket 74 part from the bar 69.

Figure 9:
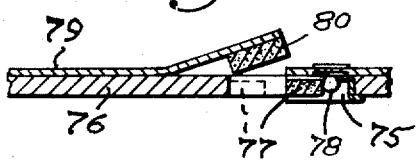
FIG. 9 is a section of a rear part of a sole in accordance with my invention.

FIG. 9 shows a socket 75 depressed in sole layer 76 and ıcluding a slidable block 77 positioned adjacent to stud 8. Top sole layer 79 is shown bent up with block 80 ttached to the underside for positioning in socket 75 to ıaintain slidable block 77 adjacent to stud 78 so as to pre-ent stud 78 from sliding out of socket 55. When block 77 slid forward to the position indicated in dotted lines, it ıaves open space enough for the stud to slide out of ɔcket 75. The blocks are shown as resilient but may be on-resilient.

Figure 10:
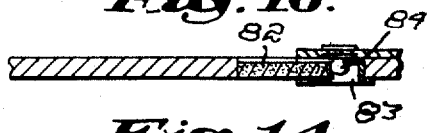
FIG. 10 is a similar section.

FIG. 10 shows a resiliently compressible block 82 in ɔcket 83 opposing stud 84 from sliding out of socket 83. /hen the block 82 is sufficiently compressible, stud 84 ın slide over it into or out of the socket.

Figure 11:
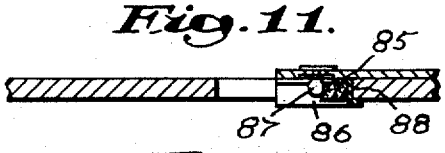
FIG. 11 is a similar section.

FIG. 11 shows a resilient block 85 in the socket 86 etween stud 87 and closed end 88 thus affording a rear ıshioning effect for comfort when the foot presses against ıe rear upper part of a heel section. It also is a way of roviding adjustability in fit.

Figure 12:
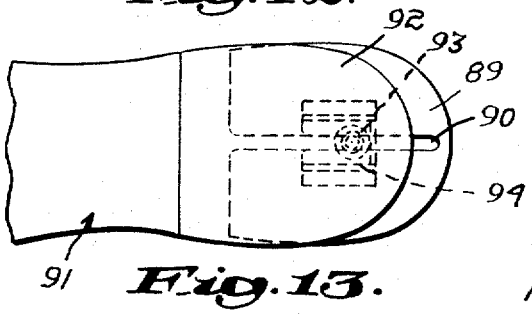
FIG. 12 is a fragmentary top plan view of the rear part of a sole with a slidable layer in accordance with my invention.
Figure 13:
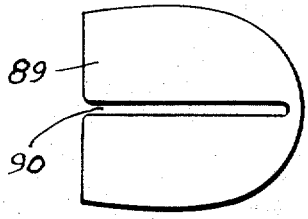
FIG. 13 is a top plan view of the slidable layer of FIG. 12.

FIG. 12 and 13 shows a layer of material 89 having an longated narrow slot 90 closed at the rear and open at ıe front for sliding between the sole layer generally ıdicated at 91 and the bottom 92 of a heel upper section, ıe sides of the slot 90 being adjacent to the narrow neck f the stud 93. The sliding layer of material is designed ɔr slipping into position after the heel upper section is etachably attached to the socket 94. It serves to provide snugness that opposes wobbling or rocking.

Figure 14:
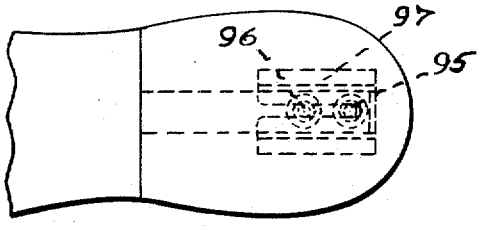
FIG. 14 is a fragmentary top plan view of the rear part of a sole in accordance with my invention.

FIG. 14 shows two studs 95 and 96 in socket 97. The ffect is similar to that of two separate sockets with a stud ı each, insofar as pertains to the opposing of the side-'ays turning of the heel upper section to which the studs re attached. A plurality of studs or sockets can also be sed in other of the examples shown in the drawings.

Figure 15:
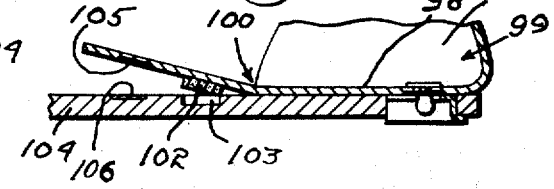
FIG. 15 is a lengthwise section illustrating another embodiment of the invention.

FIG. 15 shows the firm bottom layer 98 of the heel ɛction 99 extending forwardly and bending upward from pivot point at the front edge 100 of the heel section 101 f upper 99. The layer 98 is shown to have a downwardly rojecting part 102 attached to the underside for posi-oning in the aperture 103 in sole layer 104. At 105 a ıagnetic material is shown attached to the layer 98, and : 106 a magnetic or complementary material is shown ttached to sole layer 104, the two serving to hold down ıyer 98 with bar 102.

Figure 16:
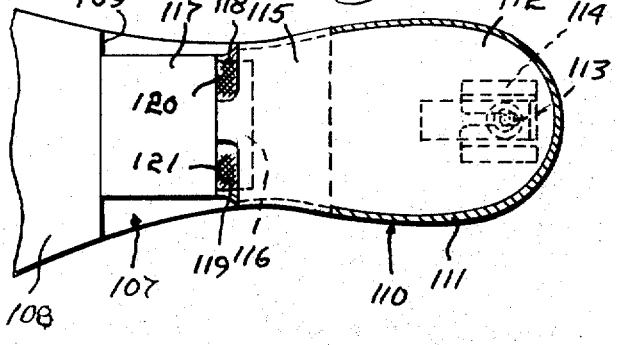
FIG. 16 is a fragmentary top plan view of the rear part of a shoe in accordance with my invention.

FIG. 16 shows a top plan view of a sole, generally ıdicated at 107 with a raised sole layer section 108 having rear edge 109. At 110 is generally indicated a heel section aving an upper section 111 and a section of bottom ıaterial 112 attached to upper section 111 and to the ɔle by stud 113 in socket 114 in the heel area and resting ı sole 107. The section 112 is shown extending forward ı the form of a sleeve 115 enclosing a narrower tongue f material 116 which widens into a wide section 117 hich butts up against the rear edge 109 of raised sole yer section 108. At each side of the sleeve 115 is elastic aterials 118 and 119 butting up against the shoulders 20 and 121, respectively, of the wider section 117. The astic material can be stretched to allow the sleeve 115 slide over section 117 or conversely, to allow section 17 to slide into sleeve 116, thus permitting the bottom ɛction of heel 112 to be contracted so as to permit stud 13 to slide out of socket 114.

From the foregoing it will be seen that footwear in ɛcordance with the invention will be improved in variability, functioning, comfort, and adaptability as well as other features.

I claim:

1. An article of footwear including a sole with a section of upper attached thereto forwardly of the heel area, a socket depressed in said sole in said heel area, said socket having a slot with a rearward entrance opening and a forward closed end in said heel area, a socket depressed in said sole forwardly of said heel area socket and rearwardly of the ball, said forward socket having a slot with a forward entrance opening and a rearward closed end, and a heel section including a section of upper and a section of material attached to said upper and resting on said sole in said heel area, said section of material having an attaching part detachably attached to said heel area socket and said section of material extending forwardly and being detachably attached to said forward socket, the sides of said rearward slot extending rearward from said close end in a sufficiently close an parallel relationship to each other *to enable said attaching part* to slide in a lengthwise direction in said slot while still attached to said socket, said material including an elastic section between said forward and rearward attachments to said sockets.

2. The article of claim 1 in which said forward socket is entirely in the shank area.

3. An article of footwear including a sole with a section of upper attached thereto forwardly of the heel area, a socket depressed in said sole in the shank area, said socket having a slot with a forward entrance opening in said shank area and a rearward closed end in said shank area, and a socket depressed in said [hole] *sole* rearwardly of said forward shank socket, said rearward socket having a slot with a rearward entrance opening and a forward closed end, and a footwear section including a section of upper and a section of material attached to said upper and extending between said sockets, said section having an attaching part detachably attached to said forward socket and having a part detachably attached to said rearward socket and said section including an elastic portion in the area between said attachments, the sides of said rearward slot extending rearward from said closed end in a sufficiently close and parallel relationship to each other to enable said rearward attaching part to slide in said slot while still attached to said socket.

4. An article of footwear including a sole with a section of upper attached thereto forwardly of the heel area, a socket depressed in said sole in said heel area, said socket having a slot with a rearward closed end and a forward entrance opening in said heel area, a socket depressed in said sole forwardly of said rearward heel area socket, said forward socket having a slot with a forward closed end and a rearward entrance opening, and a heel section including a section of upper and a section of material attached to said upper and extending between said sockets and having an attaching part detachably attached to said rearward socket and an attaching part detachably attached to said forward socket, said section of material being bendable in an upward direction in an area between said attachments, the sides of at least one of said slots extending in a lengthwise direction in a sufficiently close and parallel relationship to each other to enable the one of said attaching parts which is attached thereto to slide in said slot while still attached to said socket.

5. The article of claim 4 in which said section extending between said attachments to said sockets includes a resilient section.

6. An article of footwear including a sole with a section of upper attached thereto forwardly of the heel area, a socket depressed in said sole in said heel area, said socket having a slot with a rearward closed end and a forward entrance opening in said heel area, a socket depressed in said sole forwardly of said rearward heel area socket, said forward socket having a slot with a forward closed end and a rearward entrance opening, and a heel section including a section of upper and a section of material attached to said upper and extending between said sockets and being detachably attached to each of said sockets, said section of material including a contractable section.

7. An article of footwear including a sole with a section of upper attached thereto forwardly of the heel area, a socket depressed in said sole in said heel area, said socket having a slot with a rearward closed end and a forward entrance opening in said heel area, a heel section including a section of upper and a section of material attached to said upper and resting on said sole in said heel area, said heel section being detachably attached to said socket, a part attached to said heel section, a portion of material connected with said sole and positioned in front of said part, said portion opposing forward movement of said part and sliding of said heel section out of its position of attachment to said socket, said portion being movable from its opposing position.

8. The article of claim 7 in which said opposing portion includes a part recessed in said sole.

9. The article of claim 8 in which said recessed part is slidable away from the recessed position.

10. The article of claim 7 in which said opposing portion also opposes the sideways turning of said heel section.

11. The article of claim 7 in which said opposing portion is liftable from its opposing position.

12. The article of claim 7 in which said opposing portion includes a contractable section.

13. The article of claim 7 in which said opposing portion includes a section that is resiliently compressible.

14. The article of claim 7 in which said section of material attached to said upper and resting on said sole in said heel area extends forwardly and is the part opposed and is liftable away from the opposed position.

15. The article of claim 14 in which said opposed part is resilient.

16. The article of claim 14 in which said opposed part is contractable.

17. An article of footwear including a sole with a section of upper attached thereto forwardly of the heel area, a socket depressed in said sole in said heel area, said socket having a slot with a rearward closed end and a forward entrance opening in said heel area, a heel section including a section of upper and a section of material attached to said upper and resting on said sole in said heel area, said heel section being detachably attached to said socket, and a resilient section of material positioned in said socket between the rearward end of said socket and the attaching part of said heel section.

18. An article of footwear including a sole with a section of upper attached thereto forwardly of the heel area, a socket depressed in said sole in said heel area, a heel section including a section of upper and a section of material attached to said upper and resting on said sole in said heel area, said section of material being detachably attached to said socket, the attaching part including a narrow neck and a lower wider part maintaining said attaching part in said socket, and a slidable layer of material positioned in said heel area between said section of material and said sole, said slidable layer of material having a narrow lengthwise slot, said slot being closed rearwardly and open forwardly, the sides of said slot extending on each side of said narrow neck of said attaching part.

19. An article of footwear including a sole with a section of upper attached thereto forwardly of the heel area, a socket depressed in said sole in said heel area, said socket having a slot with a rearward closed end and a forward entrance opening in said heel area, a heel section including a section of upper and a section of material attached to said upper and resting on said sole in said heel area, said heel section being detachably attached to said socket, and a sole layer attached to said sole forwardly of said heel section and extending rearwardly, the rear part of said sole layer opposing the forward sliding of said heel section out of the position of attachment to said socket, said rear part being bendable in an upward direction from a point forwardly of said heel section.

20. The article of claim 19 in which said sole has an aperture underlying said sole layer, and a downward protrusion extending from the underside of said sole layer for positioning in said aperture.

21. An article of footwear including a sole with a section of upper attached thereto forwardly of the heel area, a socket depressed in said sole in said heel area, said socket having a slot with a rearward closed end and a forward entrance opening in said heel area, a heel section including a section of upper and a section of material attached to said upper and resting on said [hole] *sole* in said heel area, said heel section being detachably attached to said socket, said [hole] *sole* having an aperture forwardly of said heel section, said section of material extending forwardly, a downwardly projecting part extending from the underside of said material and positioned in said aperture in said sole, said part in conjunction with said section of material opposing the forward sliding of said heel section, and said part being removable from said aperture.

22. The article of claim 7 in which the forward sliding opposed is the sliding necessary to release said heel section from its attachment to said socket.

23. The article of claim 7 in which said section of material opposing forward sliding of said heel section resiliently [opposed] *opposes* said forward sliding.

24. The article of claim 7 in which said section of material opposing forward sliding of said heel section resiliently [opposed] *opposes* removal from its opposing position.

25. An article of footwear including a sole with a section of upper attached thereto forwardly of the heel area, a socket depressed in said sole in said heel area, said socket being closed at the rear and having an entrance forwardly of said closed rear, a heel section including a section of upper and a section of material attached to said upper and resting on said sole in said heel area, said heel section having a part detachably attached to said socket, and a section of material connected with said sole and opposing the removal of said detachably attached part from said socket, said opposing section of material being removable from its opposing position.

26. The article of claim 25 in which said opposing section of material resiliently opposes its removal from its opposing position.

27. The article of claim 21 in which the forward sliding opposed is the sliding necessary to release said heel section from said socket.

28. An article of footwear including a sole with a section of upper attached thereto forwardly of the heel area, a socket depressed in said sole in said heel area, a heel section including a section of upper and a section of material attached to said upper and resting on said sole in said heel area, said section of material being detachably attached to said socket, the attaching part including a narror neck and a lower wider part maintaining said attaching part in said socket, and a slidable layer of material positioned in said heel area between said section of material and said sole, said slidable layer of material having a narrow slot, said slot being closed at one end and open at the other, the sides of said slot extending on opposite sides of said narrow neck of said attaching part.

29. An article of footwear including a sole with a section of upper attached thereto forwardly of the heel area, a socket depressed in said sole in said heel area, said socket having a slot with a rearward closed end and a forward entrance, a heel section including a section of upper and a section of material attached to said upper and resting on said sole in said heel area, said heel section having a part detachably attached to said socket, and a removable section of material positioned in said socket etween the rearward end of said socket and said at-
aching part of said heel section.

*30. An article of footwear including a sole with a ection of upper attached thereto forwardly of the heel rea, a heel section including an upper portion with a ole portion attached to said upper portion, said sole ortion resting on the top of said sole in said heel area nd including material resting on each side of said top, aid sole portion having a horizontal form in said heel rea and having a degree of firmness disposing said sole ortion toward sustaining said horizontal form in said eel area, said sole portion being detachably attached to aid sole in said heel area and being detachable from and etachably reattachable to said sole without necessitating he detaching of one level of said sole from another and ithout necessitating the detaching of the rearward part f said sole from the forward part of said sole, said eel section being detachable from said footwear without ecessitating the detaching of said forwardly attached ection of upper from said sole.*

*31. An article of footwear including a sole with a sec-ion of upper attached thereto forwardly of the heel area, heel section including an upper portion with a sole por-ion attached to said upper portion, said sole portion rest-ng on the top of said sole in said heel area and including aterial resting on each side of said top, said sole por-ion having a horizontal form in said heel area and hav-ng a degree of firmness disposing said sole portion toward ustaining said horizontal form in said heel area, said ole portion being detachably attached to said sole in said eel area and being detachable from and detachably re-ttachable to said sole without necessitating the detaching f one level of said sole from another and without ecessitating the detaching of the rearward part of said ole from the forward part of said sole, said heel section eing detachable from said footwear without necessitating he detaching of said forwardly attached section of upper rom said sole and without necessitating the detaching rom said footwear of any level of the supporting tructure on which said heel section rests.*

*32. The article of claim 30 in which an attaching part is connected to said sole portion and an attaching part is connected to said sole, said attaching parts being detachably attached to each other, and said attaching parts being located in the area between the sides of said heel area.*

*33. The article of claim 32, and a layer of covering material attached to said sole forwardly of said heel section and extending over an area of said sole portion, the portion of said covering material which extends over said sole portion being liftable independently of said attaching parts.*

*34. The article of claim 30 in which said section of upper attached to said sole forwardly of the heel area has an attachment to said sole forwardly of the shank area.*

*35. The article of claim 30 in which said sole portion includes material resting on the rear of said top of said sole in said heel area.*

*36. The article of claim 32 in which said sole portion includes material resting on the rear of said top of said sole in said heel area.*

References Cited

The following references, cited by the Examiner, are of record in the patented file of this patent or the original patent.

UNITED STATES PATENTS

| | | | |
|---|---|---|---|
| 1,907,997 | 5/1933 | Nickerson | 36—44 X |
| 2,207,306 | 7/1940 | Tagler | 36—2.5 W |
| 2,844,891 | 7/1958 | Meltzer | 36—2.5 W |
| 2,897,612 | 8/1959 | Meltzer | 36—58.5 |

FOREIGN PATENTS

| | | | |
|---|---|---|---|
| 870,875 | 6/1961 | Great Britain | 36—2.5 W |

PATRICK L. LAWSON, Primary Examiner